United States Patent
Malischewski et al.

(10) Patent No.: US 11,220,938 B2
(45) Date of Patent: Jan. 11, 2022

(54) DEVICE FOR LUBRICATING A BIG-END BEARING

(71) Applicant: MAN Truck & Bus AG, Munich (DE)

(72) Inventors: Thomas Malischewski, Heilsbronn (DE); Jens Dietrich, Heilsbronn (DE); Steffen Hirschmann, Neustadt an der Aisch (DE); Dominik Renner, Ansbach (DE)

(73) Assignee: MAN Truck & Bus AG, Munich (DE)

( * ) Notice: Subject to any disclaimer, the term of this patent is extended or adjusted under 35 U.S.C. 154(b) by 252 days.

(21) Appl. No.: 16/223,928

(22) Filed: Dec. 18, 2018

(65) Prior Publication Data
US 2019/0186312 A1 Jun. 20, 2019

(30) Foreign Application Priority Data
Dec. 20, 2017 (DE) .......................... 102017130691.9

(51) Int. Cl.
*F01M 11/02* (2006.01)
*F01P 3/10* (2006.01)
(Continued)

(52) U.S. Cl.
CPC .............. *F01M 11/02* (2013.01); *F01M 1/06* (2013.01); *F01M 1/08* (2013.01); *F01P 3/10* (2013.01);
(Continued)

(58) Field of Classification Search
CPC . F01M 11/02; F01M 1/06; F01M 1/08; F01M 2001/083; F01M 2001/086;
(Continued)

(56) References Cited

U.S. PATENT DOCUMENTS

| | | | | |
|---|---|---|---|---|
| 2,523,699 A | * | 9/1950 | Holt ........................ | F02F 3/22 123/41.38 |
| 3,656,582 A | * | 4/1972 | Alcock ..................... | F16C 5/00 184/6.5 |

(Continued)

FOREIGN PATENT DOCUMENTS

| | | |
|---|---|---|
| CN | 101094731 A | 5/2014 |
| CN | 107091166 A | 8/2017 |

(Continued)

OTHER PUBLICATIONS

Machine translation of Detailed Description, Rozé, DE1097210B, Dec. 3, 1957, obtained from https://worldwide.espacenet.com/, pp. 1-6. (Year: 1957).*

(Continued)

*Primary Examiner* — Grant Moubry
(74) *Attorney, Agent, or Firm* — Maginot, Moore & Beck LLP (57) ABSTRACT

A device lubricates a big-end bearing on a crankshaft of an internal combustion engine. The device includes a piston with a fluid channel and an outlet channel fluidically connected thereto, and a connecting rod. The connecting rod has a small connecting rod eye, a large connecting rod eye and a connecting channel. The small connecting rod eye is fluidically connected to the outlet channel. The connecting channel forms a fluidic connection between the small and large connecting rod eyes so that a cooling lubricant fluid can be supplied from the fluid channel to the large connecting rod eye via the outlet channel, the small connecting rod eye and the connecting channel. In this way, the big-end bearing can be lubricated by cooling oil from the fluid channel of the piston.

17 Claims, 6 Drawing Sheets

(51) Int. Cl.
*F01M 1/06* (2006.01)
*F01M 1/08* (2006.01)
*F16C 33/10* (2006.01)
*F16C 7/02* (2006.01)

(52) U.S. Cl.
CPC .......... *F16C 7/023* (2013.01); *F16C 33/1045* (2013.01); *F01M 2001/083* (2013.01); *F01M 2001/086* (2013.01); *F01M 2011/026* (2013.01); *F01M 2011/027* (2013.01)

(58) Field of Classification Search
CPC ....... F01M 2001/066; F01M 2011/027; F01M 2011/026; F02F 3/22; F01P 3/10; F16J 1/16; F16J 1/08; F16C 33/1045; F16C 7/023; F16C 7/02; F16C 7/00; F16C 3/14; F16C 9/04; F16C 9/00
See application file for complete search history.

(56) References Cited

U.S. PATENT DOCUMENTS

| | | | | |
|---|---|---|---|---|
| 3,842,938 A | * | 10/1974 | Barnes-Moss | F16C 3/14 184/6.5 |
| 6,334,385 B1 | * | 1/2002 | Wilksch | F02F 3/22 92/159 |
| 6,568,357 B1 | * | 5/2003 | Rao | F02B 75/045 123/48 B |
| 6,907,848 B2 | * | 6/2005 | Beardmore | F01M 1/06 123/41.35 |
| 8,621,979 B2 | * | 1/2014 | Brunet | F16N 15/00 92/157 |
| 2006/0171824 A1 | * | 8/2006 | Nieter | F04B 39/0094 417/415 |

FOREIGN PATENT DOCUMENTS

| | | |
|---|---|---|
| DE | 1097210 A | 1/1961 |
| DE | 1097210 B | 1/1961 |
| DE | 1097210 A | 10/1961 |
| DE | 59203962 | 11/1995 |
| DE | 19954725 A1 | 5/2001 |
| DE | 102004048939 A1 | 5/2005 |
| DE | 102004032590 A1 | 2/2006 |
| FR | 838632 A | 3/1939 |
| JP | H039112 A | 1/1991 |
| JP | H0972215 A | 3/1997 |
| JP | 2005331056 A | 12/2005 |

OTHER PUBLICATIONS

European search report from related European application No. EP18206218.2, dated Jan. 2, 2019.
German search report from related German application, dated Feb. 7, 2018.
Chinese Office Action in related case CN 201811472333.9 dated Nov. 2, 2021. (8 pages).
English Translation of Chinese Office Action in related case CN 201811472333.9 dated Nov. 2, 2021. (5 pages).

* cited by examiner

DEVICE FOR LUBRICATING A BIG-END BEARING

The invention concerns a device for lubricating a big-end bearing on a crankshaft of an internal combustion engine.

It is known to supply lubricating oil to a big-end bearing at a crank pin of a crankshaft from the inside through the crankshaft. For this, a groove may be made in a main bearing shell of a main bearing of the crankshaft, which groove is supplied with pressurised oil. The oil can flow to the big-end bearing via a bore in the crankshaft from the main bearing to the big-end bearing at the crank pin of the crankshaft, as long as the bore in the main bearing overlaps with the groove of the main bearing shell. Such a lubricating device is known for example from DE 10 2004 032 590 A1.

DE 10 2004 048 939 A1 furthermore discloses a connecting rod which has a connecting rod body with a crank pin bore (large connecting rod eye) formed at a first end (big end), and a piston pin bore (small connecting rod eye) formed at a second end (small end). The connecting rod comprises a tube which is connected to the connecting rod body to convey lubricant from the first end to the second end.

The disadvantage with the known lubricating devices for big-end bearings may be that the bores in the crankshaft are complex and costly to produce. Furthermore, the bores may reduce the robustness of the crankshaft. In addition, supplying the big-end bearing with lubricating oil via the main bearing shells requires a high oil throughput that must be provided by an oil pump which in turn must be dimensioned accordingly and driven, thereby consuming energy (fuel).

The invention is therefore based on the object of providing an alternative and/or improved device and an alternative and/or improved method for lubricating a big-end bearing of a crankshaft, which in particular can avoid the disadvantages from the prior art.

This object is achieved by a device according to the independent claim. Further refinements are given in the dependent claims and in the description.

The device is suitable for lubricating a big-end bearing at a crankshaft of an internal combustion engine. The device comprises a piston with a fluid channel, in particular an internal piston cooling fluid channel, and an outlet channel which is fluidically connected to the fluid channel. The device comprises a connecting rod which is connected in articulated fashion, in particular pivotably, to the piston and has a small connecting rod eye, a large connecting rod eye, and an (in particular internal) connecting channel. The large connecting rod eye is configured to receive the big-end bearing. The small connecting rod eye is fluidically connected to the outlet channel. The connecting channel forms a fluidic connection between the small connecting rod eye and the large connecting rod eye, so that a fluid, in particular a cooling lubricant fluid (e.g. oil) is or can be supplied from the fluid channel to the large connecting rod eye via the outlet channel, the small connecting rod eye and the connecting channel.

In this way, the big-end bearing at the crankshaft can be lubricated by means of cooling oil from the piston. In particular, the big-end bearing can be lubricated by means of cooling oil from the internal cooling channel of the piston. The cooling oil thus also acts as a lubricating oil. This means that all lubricating oil bores in the crankshaft may be omitted. In this way, the robustness of the crankshaft can be significantly increased and the costs reduced.

Furthermore, the bearing grooves in the main bearing shells may be omitted, which can significantly reduce the oil throughput and lead to savings in fuel consumption.

In a preferred exemplary embodiment, the device furthermore comprises a piston pin which is received in the small connecting rod eye, connects the connecting rod pivotably to the piston, and has a fluid chamber which in particular is formed as a continuous bore closed on both sides and forms a fluidic connection between the outlet channel and the connecting channel. In this way, the fluid is or can be supplied from the fluid channel to the large connecting rod eye via the outlet channel, the fluid chamber, the small connecting rod eye and the connecting channel. The fluid chamber may provide a sufficient reservoir of fluid for continuous lubrication.

In a refinement, the piston pin has an outer circumferential groove into which the outlet channel opens, and the fluid chamber of the piston pin is fluidically connected to the outer circumferential groove. In particular, the outer circumferential groove may extend around the entire circumference of the piston pin. Thus, irrespective of a rotary position of the piston pin, fluid may be supplied from the outlet channel to the fluid chamber of the piston pin.

In one exemplary embodiment, the device furthermore comprises a small-end bearing which is received in the small connecting rod eye and has a (fluid) passage which extends at least partially around a circumference of the small-end bearing. Via the passage, a fluid may be conducted from an inside of the small-end bearing to an outside of the small-end bearing. In this way, a fluidic connection may be formed between the fluid chamber of the piston pin and the connecting channel (for example via outlet channels of the piston pin).

In a further exemplary embodiment, the passage is dimensioned such that it acts as a choke in order in particular to reduce the cavitation tendency in the connecting channel. In this way, in particular on downward movements of the connecting rod (piston movement from top dead centre to bottom dead centre), a cavitation of the fluid in the connecting channel may be prevented or reduced. In this way, there is no or scarcely any adverse effect on a through-flow through the connecting channel on a subsequent upward movement of the connecting rod (piston movement from bottom dead centre to top dead centre).

In one embodiment, the piston pin has a plurality of outlet channels which are spaced apart from each other in a circumferential direction around a central longitudinal axis of the piston pin and form fluidic connections between the fluid chamber and the passage. In particular, the outlet channels are arranged such that, irrespective of a rotary position of the piston pin, at least one outlet channel always opens into the passage.

In a further embodiment, the piston pin has a plurality of inlet channels which are spaced apart from each other in a circumferential direction about a central longitudinal axis of the piston pin and form fluidic connections between the outer circumferential groove and the fluid chamber of the piston pin. In particular, the plurality of inlet channels opens into the fluid chamber.

In a further embodiment, the plurality of inlet channels is arranged rotationally symmetrically in a circumferential direction around the central longitudinal axis of the piston pin.
Alternatively or additionally, the plurality of outlet channels is arranged rotationally symmetrically in a circumferential direction around the central longitudinal axis of the piston pin.

In particular, the plurality of outlet channels of the piston pin may extend centrally in the piston pin; alternatively or additionally, the plurality of inlet channels may extend in the end face regions of the piston pin.

In one embodiment variant, the device comprises at least one fluid guidance element, in particular a deflecting pipe piece or a hopper component which is arranged below an outlet opening of the outlet channel of the piston, and via which the fluid is received from the outlet channel and can be supplied to the fluid chamber of the piston pin, in particular on the end side. In particular, the at least one fluid guidance element may be provided instead of the inlet channels of the piston pin.

For example, two fluid guidance elements may be provided on opposite end faces of the piston pin.

In a further embodiment variant, the at least one fluid guidance element is mounted rotationally fixedly in a piston pin boss of the piston or is connected rotationally fixedly to the piston pin. In the case of a rotationally fixed connection of the at least one fluid guidance element to the piston pin, the at least one fluid guidance element may in particular be configured such that fluid is or can be supplied continuously between the outlet channel of the piston and the fluid chamber, irrespective of a rotary position of the piston.

In one exemplary embodiment, the outlet channel of the piston opens into a piston pin boss. In particular, a further outlet channel of the piston may be provided which is in fluidic connection with the fluid channel and opens into an opposite piston pin boss of the piston.

For example, the piston pin may comprise a further outer circumferential groove into which the further outlet channel opens, and the fluid chamber of the piston pin may be provided in fluidic connection with the further outer circumferential groove.

In particular, the plurality of inlet channels may additionally form fluidic connections between the further outer circumferential groove and the fluid chamber of the piston pin.

In a further exemplary embodiment, the fluidic connection between the outlet channel and the connecting channel is a continuous fluidic connection. In this way, fluid may be supplied continuously from the fluid channel of the piston to the big-end bearing on the crankshaft.

In a further exemplary embodiment, the device comprises a fluid injection nozzle which is directed onto an inlet opening of an inlet channel of the piston that is fluidically connected to the fluid channel. Via the fluid injection nozzle, oil can be injected into the fluid channel via the inlet channel. As well as cooling the piston, this oil may be conducted via the outlet channel and connecting channel to the big-end bearing in order to lubricate this.

In particular, the fluid injection nozzle may be supplied with a cooling lubricant fluid, for example oil, from a cooling lubricant circuit of the internal combustion engine.

In a further exemplary embodiment, the fluid injection nozzle is provided separately from the piston and from the connecting rod. Alternatively or additionally, the fluid injection nozzle is received in or attached to a crankcase.

In particular, the fluid channel may extend in the form of a ring in the piston.

The invention also concerns a motor vehicle, in particular a utility vehicle (for example a bus or a truck) with a device as disclosed herein.

It is also possible to use the device as disclosed herein for cars, large engines, off-road vehicles, stationary engines, marine engines etc.

In addition, the invention also concerns a method for lubricating a big-end bearing on a crankshaft. The method comprises the supply of a fluid, in particular a cooling lubricating fluid (e.g. oil) from a fluid channel, in particular an internal cooling fluid channel, of a piston to the big-end bearing via a connecting channel of the connecting rod.

In particular, the fluid may be supplied to the connecting channel via a small connecting rod eye of the connecting rod.

Preferably, the fluid may be supplied via a fluid chamber of a piston pin.

For example, the method may use the device disclosed herein.

The preferred embodiments and features of the invention described above may be combined with each other arbitrarily. Further details and advantages of the invention are described below with reference to the attached drawings. The drawings show.

The embodiments shown in the figures at least partially correspond, so that similar or identical parts carry the same reference signs and for their explanation, reference is also made to the description of the other embodiments or figures in order to avoid repetition.

Figure 1:
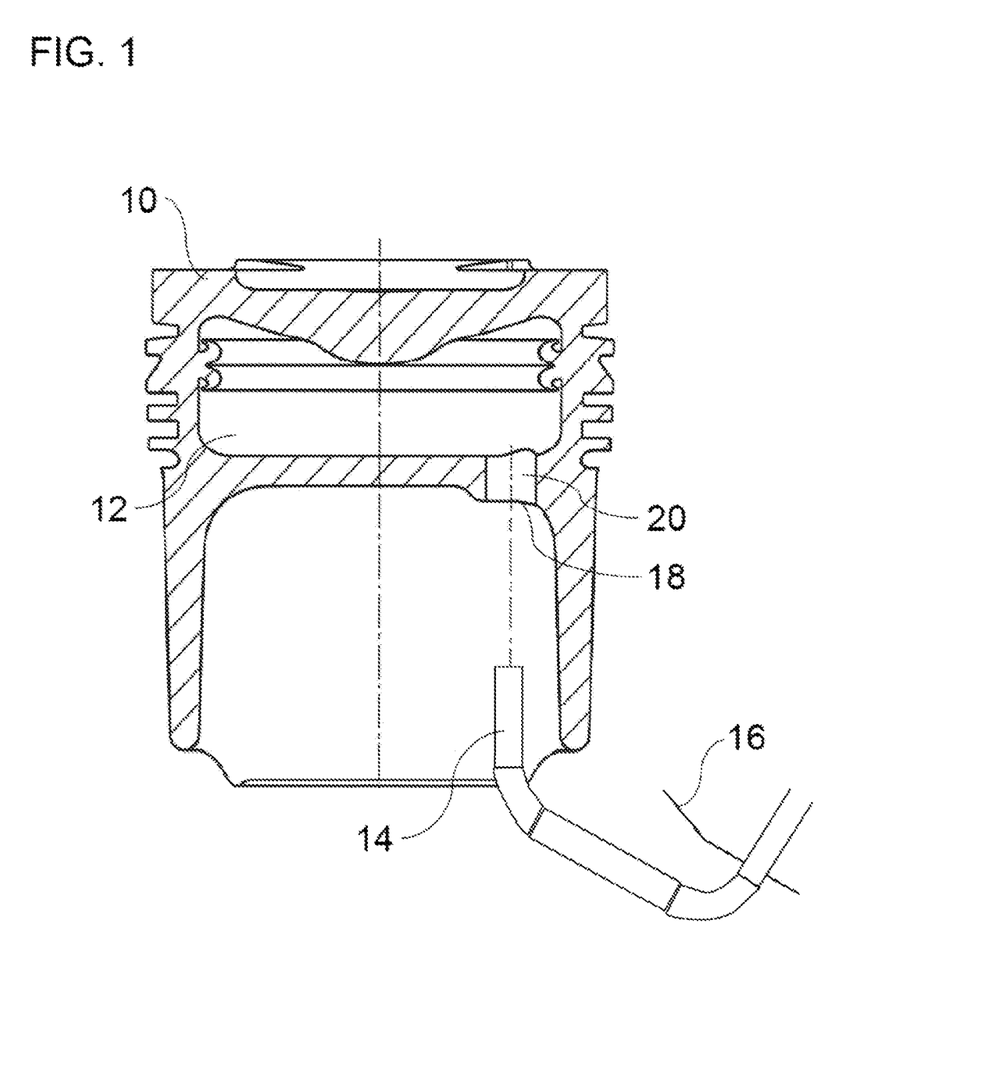
FIG. 1 a sectional view through a piston of an internal combustion engine according to a first exemplary embodiment.

FIG. 1 shows a piston 10 of an internal combustion engine in a section plane oriented eccentrically to a central axis of the piston 10. The internal combustion engine may be contained for example in a motor vehicle, in particular a utility vehicle. The utility vehicle may for example be a truck or a bus. The internal combustion engine may have a plurality of cylinders with several pistons 10.

The piston 10 has a fluid channel 12 formed as an internal piston cooling channel. The fluid channel 12 may for example extend in a ring shape in the interior of the piston 10. A fluid, in particular a cooling lubricant fluid, for example oil, may be injected into the fluid channel 12 by means of a fluid injection nozzle 14. The fluid injection nozzle 14 may for example be attached to a crankcase 16 (indicated merely diagrammatically). The fluid injection nozzle 14 is directed onto an inlet opening 18 of an inlet channel 20 of the piston 10. The inlet channel 20 opens into the fluid channel 12. Fluid injected through the inlet opening 18 by the fluid injection nozzle 14 passes via the inlet channel 20 into the fluid channel 12. Here, the fluid cools the piston 10.

Figure 2:
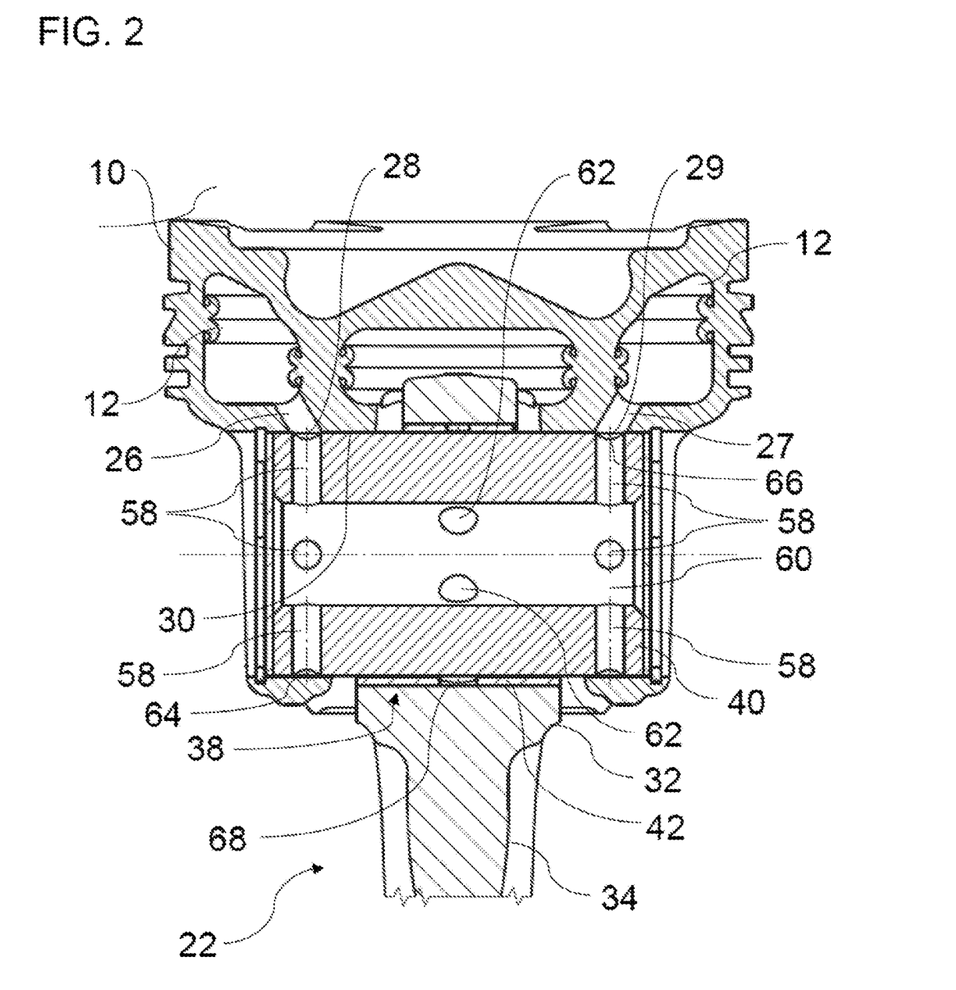
FIG. 2 a further sectional view through the piston, a piston pin and a small end of a connecting rod according to the first exemplary embodiment.
Figure 3:
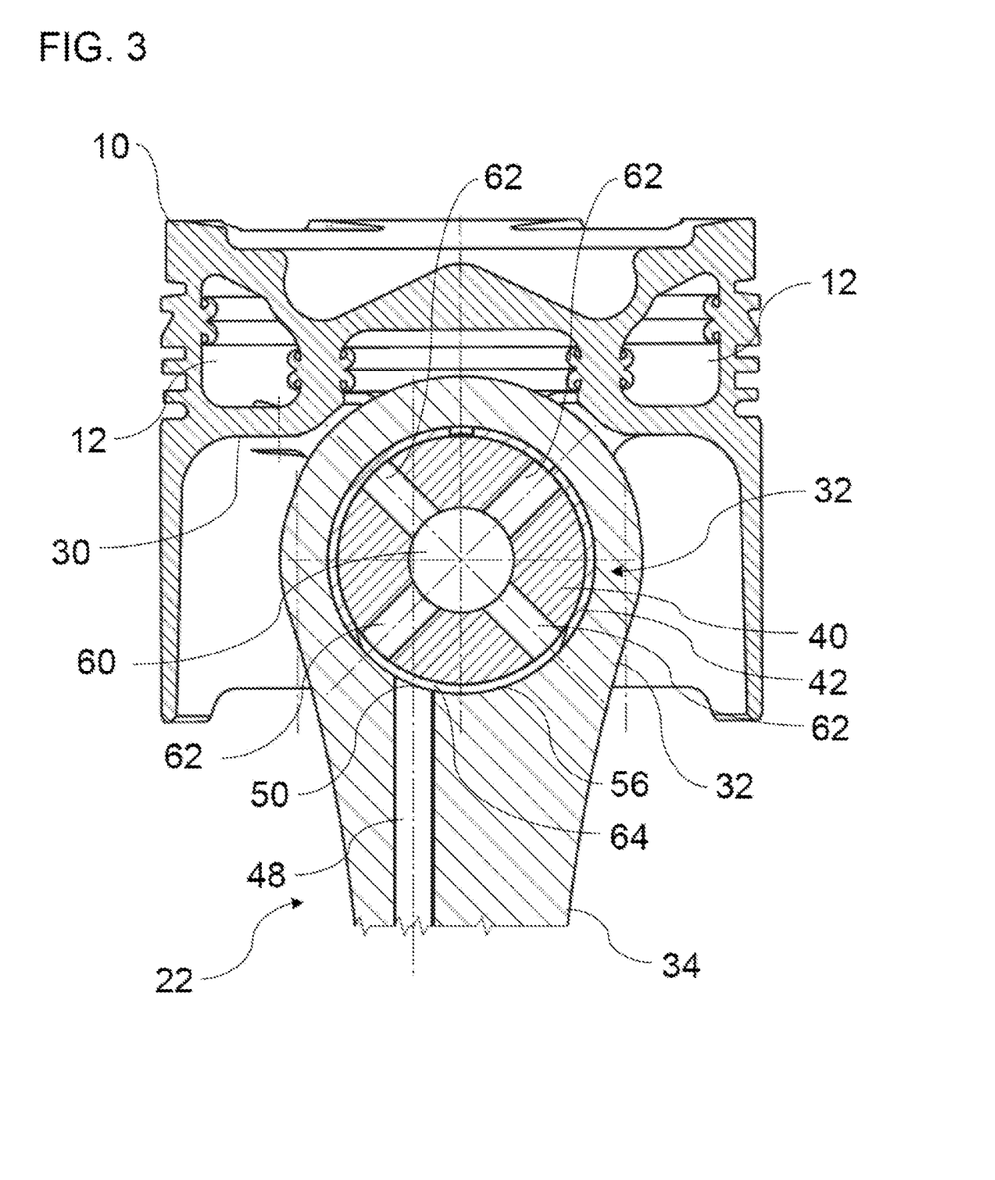
FIG. 3 a further sectional view through the piston, the piston pin and the small end according to the first exemplary embodiment.

FIGS. 2 and 3 show the piston 10 in further sectional views, wherein the section planes are each centric relative to the central axis of the piston 10 and offset to each other by 90°. For reasons of clarity, the fluid injection nozzles 14 and the crankcase 16 from FIG. 1 are not shown in FIGS. 2 and 3.

The piston 10 is connected to a crankshaft 24 (see FIG. 4) in articulated fashion, in particular pivotably, via a connecting rod 22. The crankshaft 24 is mounted on a crankcase so as to be rotatable about a rotation axis relative to the crankcase. The piston 10 is movable in translation relative to a cylinder wall of a cylinder (not shown). The translational movements of the piston 10 in the cylinder are converted into a rotational movement of the crankshaft 24 about its rotation axis. During the translational upward and downward movements of the piston 10, the latter may bear against the cylinder wall.

The piston 10 has a first outlet channel 26 and a second outlet channel 27. The outlet channels 26, 27 extend on opposite sides of the piston 10 between the fluid channel 12 and a respective outlet opening 28 or 29 in a piston crown 30 of the piston 10, in particular in the region of the piston pin bosses of the piston 10. The outlet channels 26, 27 may be drilled into the piston 10 starting from the piston crown 30. For example, the outlet channels 26, 27 may be provided as oblique bores in order to create a fluid channel 12 which is arranged radially outwardly in the piston 10, or allow the outlet channels 26, 27 to be drilled in the region of the piston pin bosses. The outlet openings 28, 29 are arranged in a rounded region of the piston crown 30. It is for example also possible to provide only one outlet channel or more than two outlet channels.

Figure 4:
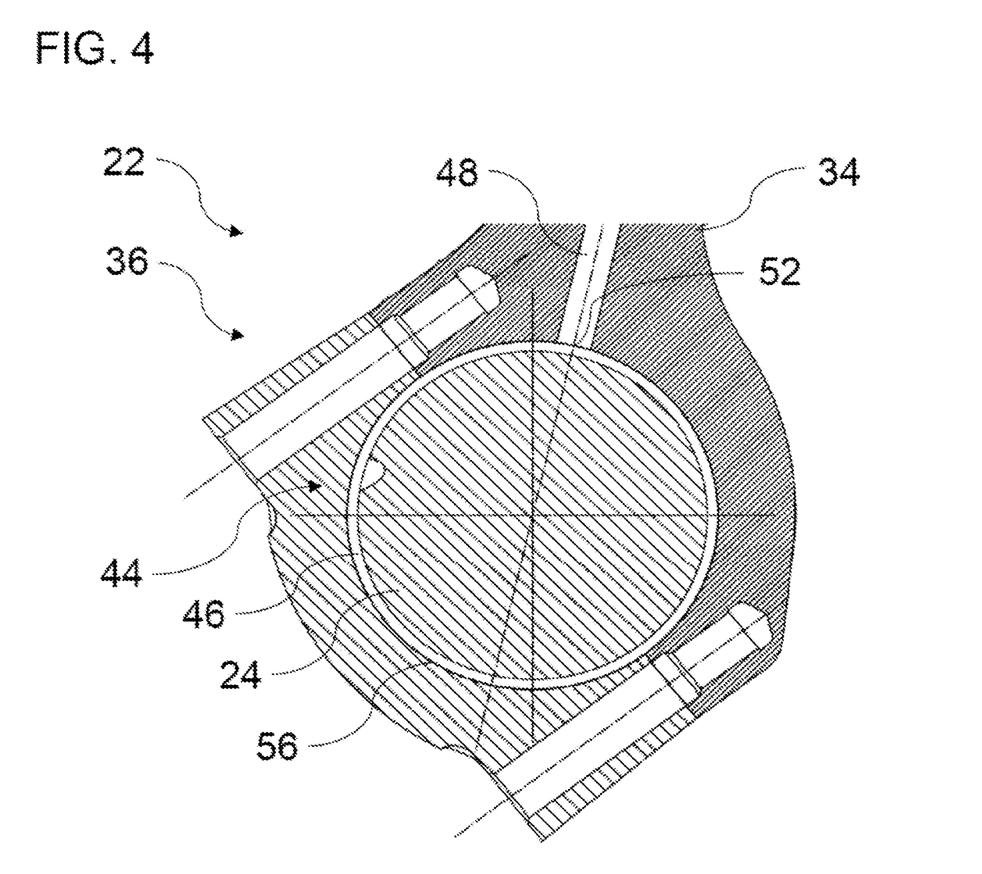
FIG. 4 a sectional view through the big end of the connecting rod.

The connecting rod 22 has a small end 32, a connecting rod shank 34 and a big end 36 (see FIG. 4). The connecting rod shank 34 extends between the small end 32 and the big end 36.

The small end 32 has a small connecting rod eye 38. In the small connecting rod eye 38, a piston pin 40 is mounted in a small-end bearing 42 that is formed e.g. as a plain bearing. The piston pin 40 connects the connecting rod 22 pivotably to the piston 10. The piston pin 40 is axially secured in the piston 10, e.g. via a lock rings.

The big end 36 shown in FIG. 4 has a large connecting rod eye 44. The large connecting rod eye 44 receives a big-end bearing 46 that is formed e.g. as a plain bearing. The big-end bearing 46 connects the connecting rod 22 pivotably to a crank pin of the crankshaft 24.

To ensure lubrication of the big-end bearing 46, the connecting rod 22 has a connecting channel 48 (see FIGS. 3 and 4). The connecting channel 48 may form a fluidic connection from the small connecting rod eye 38 to the large connecting rod eye 44. In this way, the fluid channel 12, the outlet channel 26 and the connecting channel 48 form a device for lubricating the big-end bearing 46.

The connecting channel 48 extends between an inlet opening 50 and an outlet opening 52.
The inlet opening 50 is provided on an inner circumferential face 54 of the small connecting rod eye 38. The outlet opening 52 is arranged in an inner circumferential face 56 of the large connecting rod eye 44.

The connecting channel 48 extends for example centrically or eccentrically from the small end 32 to the big end 36 of the connecting rod 22. The connecting channel 48 may for example be configured as a continuous bore which is drilled through the connecting rod 22 starting from the large connecting rod eye 44.

In order to form a fluidic connection between the outlet openings 28, 29 of the outlet channels 26, 27 and the inlet opening 50 of the connecting channel 48, the piston pin 40 and the small-end bearing 42 are specially adapted.

The piston pin 40 has a plurality of inlet channels 58, a fluid chamber 60 and a plurality of outlet channels 62.

The inlet channels 58 are arranged spaced apart from each other in a circumferential direction around a central longitudinal axis of the piston pin 40. In particular, the inlet channels 58 are arranged equidistantly or rotationally symmetrically about the central longitudinal axis of the piston pin 40. The inlet channels 58 form a fluidic connection between the outlet channels 26, 27 and the fluid chamber 60. In detail, the outlet channels 26, 27 open into outer circumferential grooves 64, 66 of the piston pin 40. The outer circumferential groove 64 extends at one end of the piston pin 40 around a circumference of the piston pin 40. The outer circumferential groove 66 extends at an opposite end of the piston pin 40 around the circumference of the piston pin 40. Some of the inlet channels 58 connect the first outer circumferential groove 64 to the fluid chamber 60. The remainder of the inlet channels 58 connect the second outer circumferential groove 66 to the fluid chamber 60.

The fluid chamber 60 is formed as a continuous bore through the piston pin 40. The fluid chamber 60 is closed with a cover (not shown) at both end faces of the piston pin 40.

The plurality of outlet channels 62 is arranged centrally in the piston pin 40. The outlet channels 62 are arranged spaced apart from each other in a circumferential direction around the central longitudinal axis of the piston pin 40. In particular, the outlet channels 62 are arranged equidistantly or rotationally symmetrically around the central longitudinal axis of the piston pin 40. The outlet channels 62 extend from an inner circumferential face of the fluid chamber 60 to an outer circumferential face of the piston pin 40.

The small-end bearing 42 comprises a passage 68. The passage 68 extends in a circumferential direction over at least part of a circumference of the small-end bearing 42. The passage 68 connects an inner circumferential face of the small-end bearing 42 to an outer circumferential face of the small-end bearing 42. The passage 68 is dimensioned such that, depending on a rotary position of the piston pin 40, at least one outlet channel 62 of the several outlet channels 62 opens into the passage 68. The passage 68 is provided in the region of the inlet opening 50 of the connecting channel 48. Thus the passage 68 forms a fluidic connection between the outlet channels 62 and the connecting channel 48.

Thus a continuous fluidic connection exists between the fluid channel 12 and the big-end bearing 46 via the outlet channels 26, 27, the outer circumferential grooves 64, 66, the inlet channels 58, the fluid chamber 60, the outlet channels 62, the passage 68 and the connecting channel 48. In addition, the piston pin 40 and the small-end bearing 42 may be lubricated via the continuous fluidic connection. Also, the piston pin 40 and the small-end bearing 42 may be lubricated by fluid mist, for example oil mist, which results from the fluid injection from the fluid injection nozzle 14 (see FIG. 1).

The passage 68 may here be dimensioned or configured such that a cavitation tendency in the connecting channel 48 is reduced, so that in particular on downward movements of the connecting rod 22 from top dead centre to bottom dead centre, no cavitation or scarcely any cavitation occurs in the connecting channel 48 which would adversely affect the through-flow. In particular, the passage 68 is configured to act as a choke. Thus during the downward movement of the connecting rod 22, only little fluid can escape from the connecting channel 48.

It is also possible that the fluid reaches the fluid chamber 60 in a different manner from that in the first exemplary embodiment, as will be described as an example below with reference to FIGS. 5 to 8.

Figure 5:
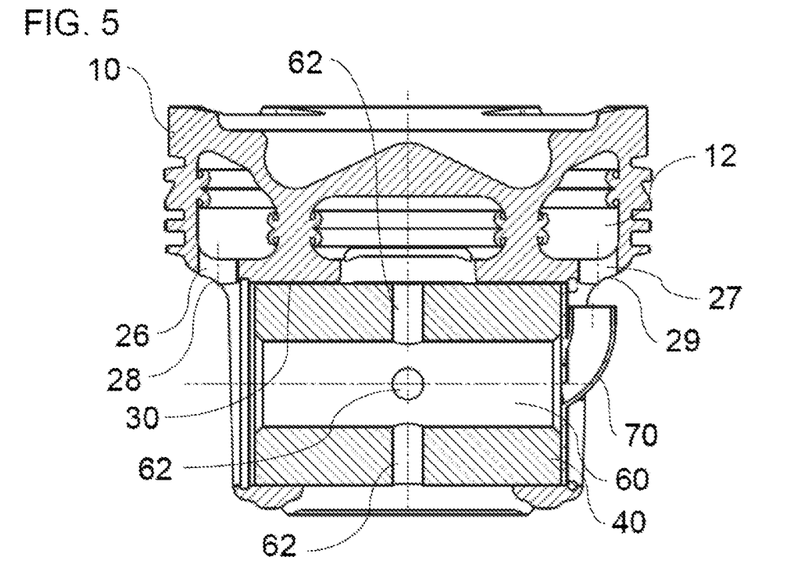
FIG. 5 a sectional view through a piston and a piston pin according to a second exemplary embodiment.

FIG. 5 shows a second exemplary embodiment. Here, by means of a fluid guidance element 70, the fluid is conducted from the outlet channel 27 into the fluid chamber 60. The fluid guidance element 70 is arranged rotationally fixedly in the piston pin boss of the piston 10 in a defined orientation. The fluid guidance element 70 is arranged below the outlet opening 29 of the outlet channel 27. The fluid guidance element 70 is configured as a deflector pipe piece which deflects the fluid emerging from the outlet opening 29 into the fluid chamber 60. For this, the fluid guidance element 70 is arranged on the end side of the piston pin 40 and formed as an arc. The other end face of the piston pin 40 is closed with a cover (not shown). It is for example also possible for a fluid guidance element to be arranged at both end faces of the piston pin 40.

Figure 6:
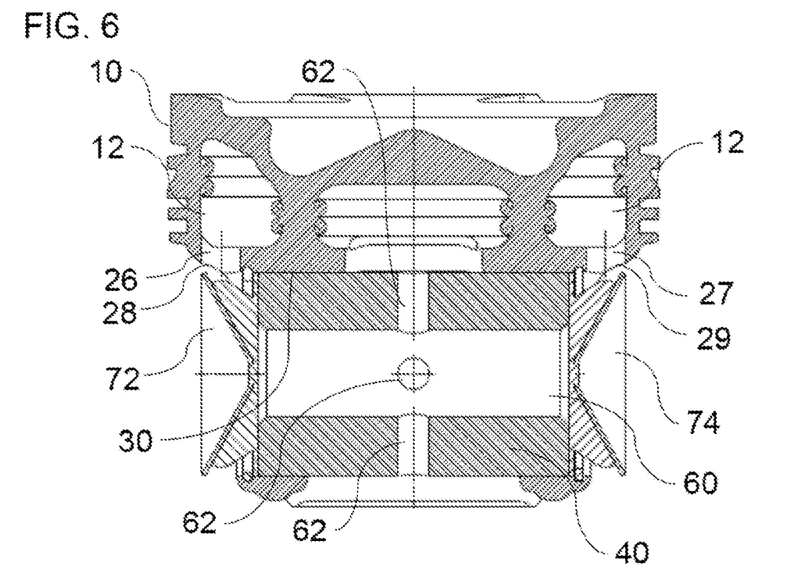
FIG. 6 a sectional view through a piston and a piston pin according to a third exemplary embodiment.
Figure 7:
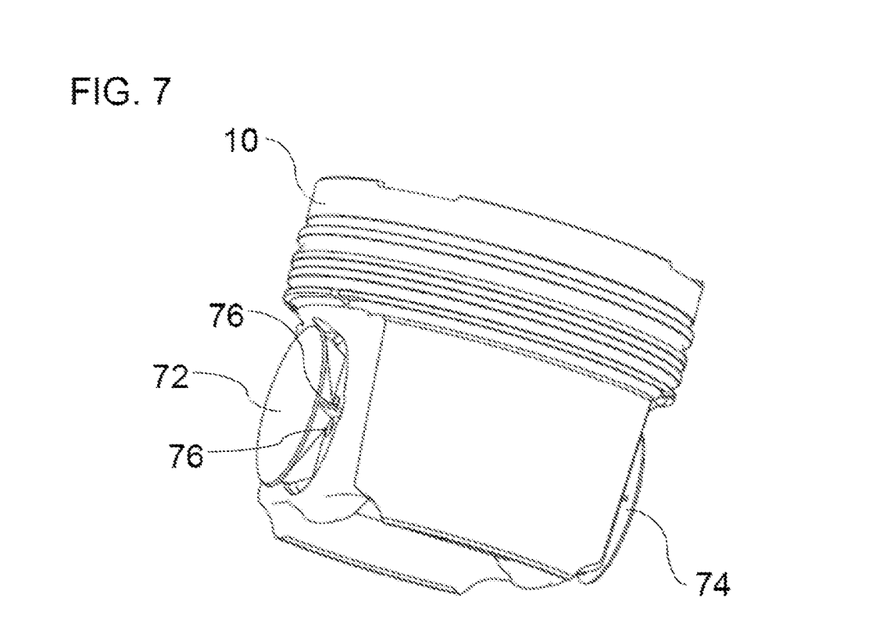
FIG. 7 a perspective view of the piston according to the third exemplary embodiment.
Figure 8:
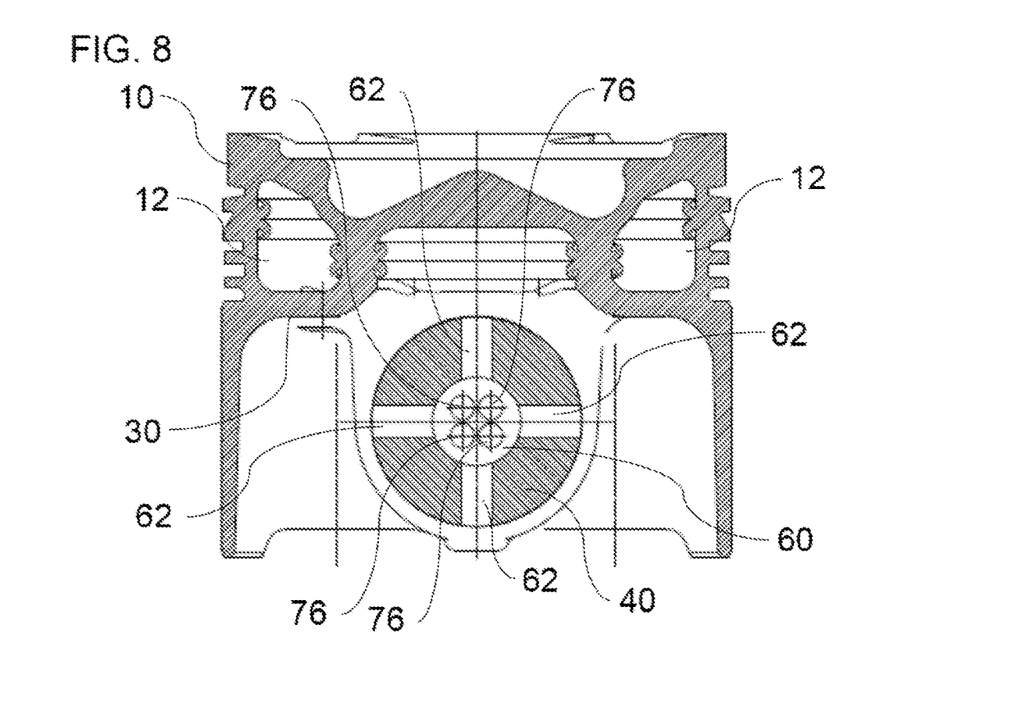
FIG. 8 a further sectional view through the piston and the piston pin according to the third exemplary embodiment.

FIGS. 6 to 8 show a third exemplary embodiment. Here too, by means of two fluid guidance elements 72, 74, fluid is conducted from the outlet channels 26, 27 into the fluid chamber 60. The fluid guidance elements 72, 74 are connected rotationally fixedly to the piston pin 40.

The fluid guidance elements 72, 74 are configured such that, irrespective of a rotary position of the piston pin 40, the fluid from the outlet channels 26, 27 is conducted into the fluid chamber 60. In particular, the fluid guidance elements 72, 74 are formed hopper-like and have a plurality of passages 76 which conduct the fluid into the fluid chamber 60. One passage 76 is assigned to each hopper-like portion of the fluid guidance element 72 or 74. Thus independently of the rotary position of the piston pin 40, one hopper-like portion of the fluid guidance element 72 or 74 is always positioned below the outlet channels 26, 27 to receive fluid.

The devices disclosed herein for lubricating the big-end bearing 46 are based on an innovative lubrication method. This lubrication method comprises the supply, in particular the injection, of a fluid, for example oil, by means of the fluid injection nozzle 14 into the fluid channel 12 of the piston 10. The method furthermore comprises the supply of the fluid from the fluid channel 12 to the big-end bearing 46 via at least one outlet channel 26, 27 of the piston 10, the small connecting rod eye 38 and the connecting channel 48. In particular, the fluid may be conducted via the fluid chamber 60 of the piston pin 40 to the connecting channel 48. It is pointed out that to perform the method, other configurations are possible, in particular of the outlet channel 26, piston pin 40 and connecting channel 48.

The invention is not restricted to the preferred exemplary embodiments described above. Rather, a multiplicity of variants and derivatives are possible which also make use of the inventive concept and therefore fall within the scope of protection. In particular, the invention also claims protection for the subject and features of the subclaims independently of the claims to which they refer. In particular, the features of the independent claim 1 are disclosed independently of each other. In addition, the features of the subclaims are disclosed independently of all features of the independent claim 1, and for example independently of the features relative to the presence and/or configuration of the piston and/or the connecting rod of the independent claim 1.

LIST OF REFERENCE SIGNS

10 Piston
12 Fluid channel
14 Fluid injection nozzle
16 Crankcase
18 Inlet opening
20 Inlet channel
22 Connecting rod
24 Crankshaft
26 Outlet channel
27 Outlet channel
28 Outlet opening
29 Outlet opening
30 Piston crown
32 Small end
34 Connecting rod shank
36 Big end
38 Small connecting rod eye
40 Piston pin
42 Small-end bearing
44 Large connecting rod eye
46 Big-end bearing
48 Connecting channel
50 Inlet opening
52 Outlet opening
54 Inner circumferential face
56 Inner circumferential face
58 Inlet channel
60 Fluid chamber
62 Outlet channel
64 Outer circumferential groove
66 Outer circumferential groove
68 Passage
70 Fluid guidance element
72 Fluid guidance element
74 Fluid guidance element
76 Passage

The invention claimed is:

1. A device for lubricating a big-end bearing on a crankshaft of an internal combustion engine, comprising:
   a piston having a fluid channel, the fluid channel comprising an internal piston cooling fluid channel, the piston further comprising an outlet channel fluidically connected to the fluid channel;
   a connecting rod connected in articulated pivotable fashion to the piston and having a small connecting rod eye, a large connecting rod eye and a connecting channel,
   a piston pin which is received in the small connecting rod eye, the piston pin pivotably connecting the connecting rod to the piston, and having a fluid chamber formed as a continuous bore having end sides and which forms a fluidic connection between the outlet channel and the connecting channel;
   at least one fluid guidance element extending from one of the end sides of the piston pin and which is arranged below an outlet opening of the outlet channel of the piston and via which the fluid is received from the outlet channel and can be supplied to the fluid chamber of the piston pin;
wherein:
   the large connecting rod eye is configured to receive the big-end bearing;
   the small connecting rod eye is fluidically connected to the outlet channel; and
   the connecting channel forms a fluidic connection between the small connecting rod eye and the large connecting rod eye so that a cooling lubricant fluid is or can be supplied from the fluid channel to the large connecting rod eye via the outlet channel, the small connecting rod eye and the connecting channel.

2. The device according to claim 1, wherein:
the piston pin has an outer circumferential groove into which the outlet channel opens, and the fluid chamber of the piston pin is fluidically connected to the outer circumferential groove.

3. The device according to any of claim 2, wherein:
the piston pin has a plurality of inlet channels which are spaced apart from each other in a circumferential direction around a central longitudinal axis of the piston pin and form fluidic connections between the outer circumferential groove and the fluid chamber of the piston pin.

4. The device according to claim 2, further comprising:
a small-end bearing which is received in the small connecting rod eye and has a passage which extends at least partially around a circumference of the small-end bearing.

5. The device according to claim 4, wherein:
the passage is dimensioned such that it acts as a choke in order to reduce a cavitation tendency in the connecting channel.

6. The device according to claim 4, wherein:
the piston pin has a plurality of outlet channels which are spaced apart from each other in a circumferential direction around a central longitudinal axis of the piston pin and form fluidic connections between the fluid chamber and the passage.

7. The device according to claim 6, wherein:
the piston pin has a plurality of inlet channels which are spaced apart from each other in a circumferential direction around a central longitudinal axis of the piston pin and form fluidic connections between the outer circumferential groove and the fluid chamber of the piston pin.

8. The device according to claim 7, wherein:
the plurality of inlet channels is arranged rotationally symmetrically in a circumferential direction around the central longitudinal axis of the piston pin; and/or
the plurality of outlet channels is arranged rotationally symmetrically in a circumferential direction around the central longitudinal axis of the piston pin.

9. The device according to claim 1, wherein:
the at least one fluid guidance element is a deflecting pipe piece or a hopper component.

10. The device according to claim 9, wherein:
the at least one fluid guidance element is mounted rotationally fixedly in a piston pin eye of the piston or is connected rotationally fixedly to the piston pin.

11. The device according to claim 1, wherein:
the outlet channel of the piston opens into a piston pin eye, and in particular a further outlet channel of the piston in fluidic connection with the fluid channel opens into an opposite piston pin eye of the piston.

12. The device according to claim 1, wherein:
the fluidic connection between the outlet channel and the connecting channel is a continuous fluidic connection.

13. The device according to claim 1, further comprising:
a fluid injection nozzle, which is directed onto an inlet opening of an inlet channel of the piston that is fluidically connected to the fluid channel.

14. The device according to claim 13, wherein:
the fluid injection nozzle is provided separately from the piston and from the connecting rod; and/or
the fluid injection nozzle is received in or attached to a crankcase.

15. The device according to claim 1, further comprising:
a small-end bearing which is received in the small connecting rod eye and has a passage which extends at least partially around a circumference of the small-end bearing.

16. The device according to claim 15, wherein:
the passage is dimensioned such that it acts as a choke in order to reduce a cavitation tendency in the connecting channel.

17. A motor vehicle, in particular a utility vehicle, with a device comprising:
a piston having a fluid channel, the fluid channel comprising an internal piston cooling fluid channel, the piston further comprising an outlet channel fluidically connected to the fluid channel;
a connecting rod connected in articulated pivotable fashion to the piston and having a small connecting rod eye, a large connecting rod eye and a connecting channel,
a piston pin which is received in the small connecting rod eye, the piston pin pivotably connecting the connecting rod to the piston, and having a fluid chamber formed as a continuous bore having end sides and which forms a fluidic connection between the outlet channel and the connecting channel;
at least one fluid guidance element extending from one of the end sides of the piston pin and which is arranged below an outlet opening of the outlet channel of the piston and via which the fluid is received from the outlet channel and can be supplied to the fluid chamber of the piston pin;
wherein:
the large connecting rod eye is configured to receive the big-end bearing;
the small connecting rod eye is fluidically connected to the outlet channel; and
the connecting channel forms a fluidic connection between the small connecting rod eye and the large connecting rod eye so that a cooling lubricant fluid is or can be supplied from the fluid channel to the large connecting rod eye via the outlet channel, the small connecting rod eye and the connecting channel.

* * * * *